H. G. Tyer,
Rubber Shoe.

No. 2,820. Reissued Dec. 24, 1867.

Witnesses:

G. F. Holt Jr.
S. N. Pepper

Inventor:
Henry G. Tyer
by his attorney
R. H. Eddy

N. PETERS, PHOTO-LITHOGRAPHER, WASHINGTON, D. C.

United States Patent Office.

HENRY G. TYER, OF ANDOVER, MASSACHUSETTS.

*Letters Patent No.* 68,398, *dated September* 3, 1867; *reissue No.* 2,820, *dated December* 24, 1867.

IMPROVEMENT IN OVER-SHOES.

The Schedule referred to in these Letters Patent and making part of the same.

TO ALL WHOM IT MAY CONCERN:

Be it known that I, HENRY G. TYER, of Andover, in the county of Essex, and State of Massachusetts, have invented a new Improvement in Over-Shoes; and I do hereby declare the following, when taken in connection with the accompanying drawings, and the letters of reference marked thereon, to be a full, clear, and exact description of the same, and which said drawings constitute part of this specification, and represent, in—

Figure 1:
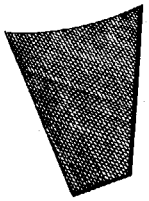

Figure 1, a view of a trapezoidal piece of the gore-cloth to be used in the formation of the shoe.

Figure 2:
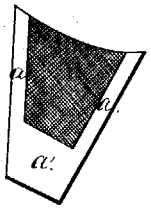

Figure 2, such piece of cloth with cement applied to it about its edges.

Figure 3:
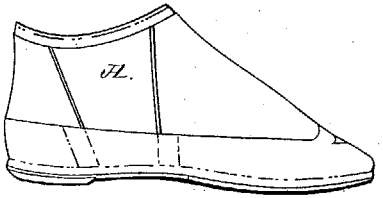

Figure 3, a side view of a shoe provided with elastic gores, formed of elastic cloth, and a vulcanizable material, one of such gores being shown at A.

Figure 4:
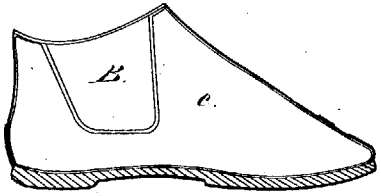

Figure 4, a longitudinal section of the shoe, showing where the inelastic lining is removed after vulcanization of the shoes.

This invention relates to an improvement in over-shoes or boots, made from water-proof material, whereby the straps, buckles, or buttons, usually employed to secure the boot or shoe, are dispensed with; and the invention consists in the insertion of a vulcanizable gore or gores, of elastic material, in such part of the boot or shoe as may be most desirable during the construction of such boot or shoe, and before its vulcanization; the latter process being applied after the several parts composing the shoe are united, the same causing all the various pieces to become consolidated, and a perfect boot or shoe, with one or more elastic gores, to be the result.

To enable others skilled in the manufacture of rubber shoes to use my invention, I will proceed to describe the operation, selecting a gaiter-boot or shoe as the prominent means of illustration.

I first prepare the lining *c* (see fig. 4) of flannel, or other suitable material, by coating the same with a vulcanizable cement of rubber, or other adhesive vulcanizable compound. After having reduced the lining, or piece composing it, to shape, I draw or place it over a last and inner sole, in the usual manner, so that the cemented side of such lining may be outward. I next procure a fabric of cloth, with certain peculiarities of manufacture, capable of great lateral extension, preferring that known as "diagonal cloth," in which the threads of the warp cross those of the filling at acute angles rather than at straight angles, such being as shown in fig. 1. I do not confine myself to any one particular fabric or material, using any, however manufactured or prepared, if elastic or capable of the necessary extension and construction. I proceed to coat the material on one side with a vulcanizable rubber cement or composition, taking special care not to stretch the cloth in handling it. I next cut from the cloth so coated the insertion or gore-piece, of such shape as may be desirable. Next, I apply India-rubber cement to the bottom and side edges of the gore, laying it thereon about three-eighths of an inch wide, and on the uncemented face thereof, the same being as shown in fig. 2, in which *a a a* denote the cement. Next, I place the gore in its proper position on the lining, and with a strip of paper or cloth arranged between the gore and the lining, in order to guard against their union except at the cemented edges of the gore in the after-process of vulcanization. The object of retaining the lining whole or uncut at the gore, is to prevent the lateral extension of the gore when the rubber is in a softened state during vulcanization. I next cut from a sheet of vulcanizable rubber or rubber compound, a piece of the same shape as the inner part of the gore before referred to, but somewhat larger, so that the edges may extend beyond the first piece when laid thereon and united thereto. Sometimes I spread a sufficient thickness of coating of rubber on the gore-lining in the first instance, rendering the sheet just spoken of unnecessary; but I prefer that the lining and sheet-gum should be distinct from each other. I next take strips of thin sheet-rubber, or rubber compound, say three-eighths of an inch wide, and turn and roll over one edge thereof, for binding and making a neat finish entirely around the top of the boot and that of the gore, this binding affording additional strength to such part of the boot or shoe, it being that which has to resist the heavier strain. I next prepare the "diagonal cloth," or other elastic fabric which I intend using for the outside of the gore or insertion. This I do by cementing it precisely as hereinbefore described for the inner part or lining of the same, and cut it into similar shape to that, taking particular care, in doing so, that the threads of the warp and filling of the two pieces, when they are united, bear such relative positions to each other as to render both pieces capable of extension in the same direction, failing in which the elasticity of the gore or insertion would thereby be in a great measure destroyed. After this outside piece may have been securely fastened in its proper position, I proceed to finish the boot or shoe in such manner and style as may be required. This, and the subsequent operation being well known to India-rubber manufacturers, as well as the after-vulcanization of the boot or shoe in a complete state, I finally cut away or remove the lining of the shoe in the rear of the gore, in order to allow the gore full freedom to expand.

It will be observed that I have first formed the lining whole, and finally cut away that part immediately in the rear of the gore, and that this is done simply to retain the gore in its proper form and position during the process of vulcanization; but I do not wish it to be understood that it is positively essential that the lining be formed whole and so cut away, as the lining may first be cut so as to leave a space in the rear of the gore, and depend upon the gore itself or other means to sustain the gore during the process of construction and vulcanization; and to so form the lining is a considerable saving of cost over what it is to form the lining whole, as, when formed whole, the piece after it is cut away is wasted.

I do not claim broadly the insertion of an elastic gore in a boot or shoe, such being an article of extensive manufacture at the present time; neither do I claim simply the formation of an elastic fabric, such being well known, and the subject of many patents; neither do I claim the lining of an India-rubber shoe with ordinary stockinet, such being daily manufactured; but What I do claim as my invention, and desire to secure by Letters Patent, is—

A boot or shoe constructed with an elastic gore or gores of vulcanizable material, when the said gore is inserted into the shoe before vulcanization, and during the process of construction, and the whole completed by vulcanization, substantially as set forth.

HENRY G. TYER

Witnesses:
JOHN E. EARLE,
JOHN H. SHUMWAY.